United States Patent Office 2,871,951
Patented Feb. 3, 1959

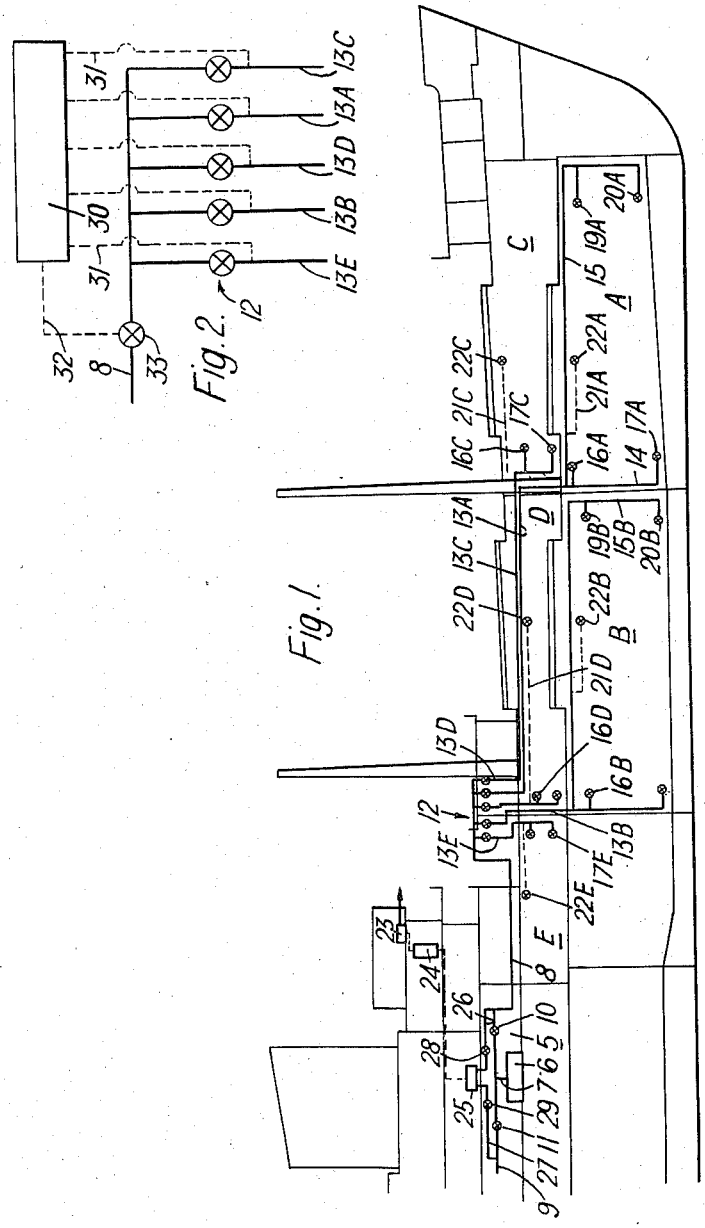

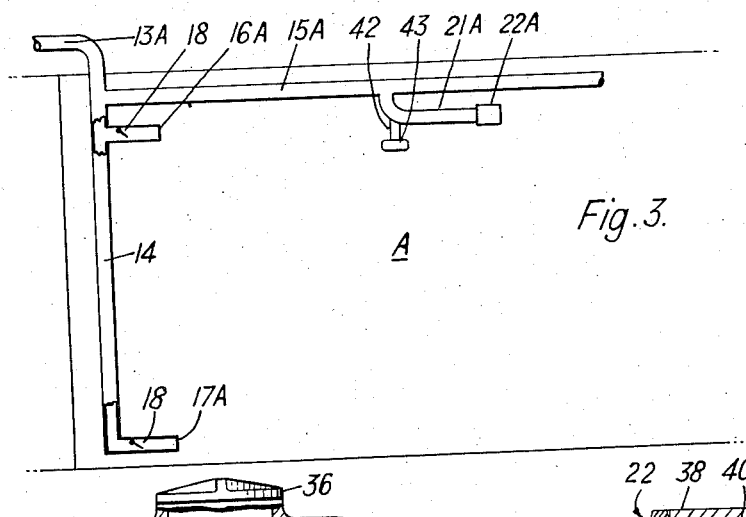
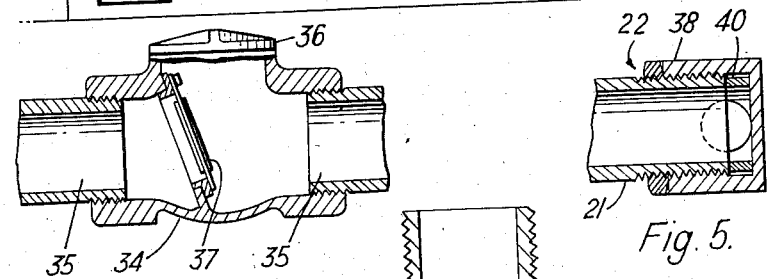
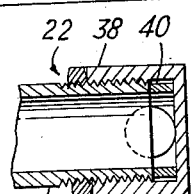
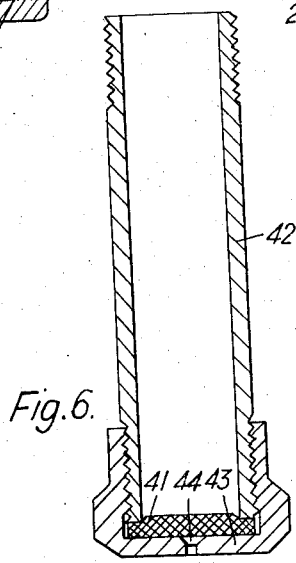

2,871,951
SMOKE-DETECTING AND FIRE-EXTINGUISHING APPARATUS

Howard Edwin Bedford, Brentford, England, assignor to The Pyrene Company Limited, Brentford, England Application February 7, 1957, Serial No. 638,715

Claims priority, application Great Britain February 16, 1956

7 Claims. (Cl. 169—5)

This invention relates to combined smoke-detecting and fire-extinguishing apparatus particularly suitable for use in ships.

In order to extinguish fires in ships it is most advantageous to deliver inert gas from a central source through a pipe system to outlets in the holds and other spaces constituting points of risk. It is highly desirable to ensure that by detection of smoke the earliest possible warning of the existence of the fire is given, and it is well known that smoke-detection systems include pipes running from the various points of risk to some central point at which an automatic smoke-detector is commonly installed.

In the past the inert gas for extinguishing the fire has usually been carbon dioxide, which is delivered under a considerable pressure through pipes of fairly small bore, say ¾ inch. These pipes are of convenient size for use in smoke-detection systems, and accordingly have been used for this purpose also, a control valve being operated when smoke is detected to cut off the pipe system from the smoke-detector and connect it to the source of supply of carbon dioxide.

Another inert gas which may be used for fire-extinguishing in ships is the product of combustion of oil, which in this specification we will call combustion gas. A system using combustion gas has many advantages, but the gas is much lighter than carbon dioxide and is supplied at a much lower pressure. This means that the system used to deliver combustion gas to points of risk is not suitable for smoke-detection for two reasons.

First, carbon dioxide, being relatively heavy, is always delivered into the top of the hold or other space to sink downwards, that is to say, the point of delivery is the same as that from which air must be withdrawn to flow to the smoke-detector. Some at least of the relatively lighter combustion gas must, however, be delivered towards the bottom of the hold or other space, that is to say, at a point unsuitable for the withdrawal of air.

Second, because the combustion gas is under low pressure, the pipes conveying it to the points of risk must be fairly large, consisting for instance of 5 inch bore mains feeding discharge pipes of 4 inch bore, and the ends of these discharge pipes are not suitable for withdrawing continuous samples of air.

It is the principal object of this invention to provide apparatus suitable both for supplying combustion gas to the points of risk and for withdrawing air for sampling purposes from the points of risk.

According to this invention a pipe system connected to both a source of combustion gas and a smoke-detector and having relatively large outlets in the lower parts of spaces constituting points of risk also contains non-return valves permitting flow of the gas through the outlets and relatively small inlets for air flowing through the system to the smoke-detector, the inlets being located upstream of the non-return valves and in the upper parts of the spaces. When air is being drawn from the holds or other spaces the non-return valves close and air is drawn only through the inlets, which may be located close to the tops of the holds or other spaces. When combustion gas is being supplied to a hold or other space, the valve or valves in that space open.

The inlets may be no more than holes in the pipes, but preferably are in air-collecting heads on the ends of branch pipes leading to the pipes containing the non-return valves. In either case the combustion gas can also flow out through them. The quantity which thus flows into a hold or other space is small relatively to that flowing past the non-return valve or valves in that space and serves to purge any air which may be trapped, for example under a hatch cover or in any pocket in the deck head of a hold.

One apparatus in accordance with the invention will now be described with reference to the accompanying drawings, in which:

Figure 1 is a diagrammatic representation of part of the apparatus installed in a ship;

Figure 2 shows a detail on a larger scale;

Figure 3 shows the arrangement in one hold on a larger scale;

Figure 4 is a section of a non-return valve which may be used in the pipe system;

Figure 5 is a section of an air-collecting head which may be used in the pipe system; and Figure 6 is a section through a device for draining condensed water from the pipe system.

Figure 1 shows the forward part of a ship in which two holds A and B and tween-deck spaces C, D and E are all points of risk. A generator 6 of combustion gas is arranged to supply the gas to all these points and to similar points in the after part of the ship. The gas leaves the generator through a pipe 7 which has two branches 8 and 9 controlled by valves 10 and 11 respectively. These pipes 8 and 9 are of 5 inch bore, and both valves 10 and 11 are normally closed.

The pipe 8 leads to a bank of five valves 12, all of which are normally open, and from these valves pipes 13A . . . 13E run to the five points of risk.

On arriving at the hold A the pipe 13A branches into pipes 14 and 15 of 4 inch bore, the former running vertically downwards and having upper and lower outlets 16A and 17A, as shown in Figure 3. Each outlet contains a non-return valve 18. The pipe 15 runs to the other end of the hold and has two similar outlets 19A and 20A also controlled by non-return valves 18.

From the pipe 15 a pipe 21A of 1 inch bore branches to the upper part of the hold and terminates in an air-collecting head 22A.

The arrangment of pipes and valves in the hold B is similar to that in the hold A. In the three tween-deck spaces it differs in that there are only two outlets, 16C and 17C, and the incoming pipe, e. g. 13C, merely has a narrow branch to an air-collecting head 22C.

A continuously driven fan 23 is connected to the pipes 8 and 9 through a smoke-detector 24 and a smoke indicator 25 by pipes 26 and 27 controlled by valves 28 and 29 respectively, which are normally open.

The bank of valves 12 is associated with a smoke-indicator 30 (see Figure 2). Pipes 31 lead from the valves 12 to the indicator 30 and a pipe 32 joins the pipe 8 at a two-way valve 33, which is normally set to allow flow to take place through the pipes 31 and 32.

In all the figures, the pipes used only for smoke-detection are shown dotted.

The pipe 9 leads through a bank of valves similar to that shown at 12 and through pipes to points of risk in the after part of the ship, the arrangement being in all respects similar to that shown in the forward part.

In operation, air is continuously drawn by the fan 23 from the points of risk through the air collecting-heads 22, the pipes 13, the valves 12, the indicators 30 and 25, and the detector 24. When smoke is detected by this detector the hold or other space where the fire is burning is first located by means of the indicator 25, which shows whether the fire is fore or aft. Assuming that the fire is in the hold A, the indicator 25 merely shows it to be in the forward part of the ship. Therefore the indicator 30 is inspected and shows that the smoke is coming from the hold A. Thereupon the valve 33 is changed over and the valve 12 in the pipe 13A opened. The generator 6 is started up, and the valve 10 opened. Combustion gas is supplied through the pipes 8, 13A, 14 and 15 to the outlets 16A, 17A, 19A and 20A. The pressure will be enough to open all the non-return valves 18 controlling these outlets. In addition some gas will also flow out through the air-collecting head 22A.

To prevent any inert gas entering and containing the indicator 30, interlinked valves may be provided in the pipes 31 and be operated to close these pipes when the valve 33 is changed over.

Figure 4 shows the construction of the preferred non-return valve 18 for use in the invention.

This is a normally closed flap valve consisting of a valve body 34 with screw-threaded sockets 35 for screwing onto the gas distribution pipes in the system. The valve body has a cover 36 for inspection of the flap 37. The flap is made of leather stiffened with an aluminum disc attached to each side, and it is made so light that it will open with certainty under the low pressure of the combustion gas flowing in the direction of the arrow.

Figure 5 shows the preferred construction of collecting head 22. The end of a branch pipe 21 is threaded and a cap 38 screws over it. The cap has a lateral opening 39 through which air is drawn into the space between the end of the pipe and the cap. By adjusting the cap, the size of the aperture through which air is drawn may be varied. It is preferred to insert a distance piece 40 in the cap to ensure that the opening is not wholly closed if the cap is screwed fully home on the pipe. By adjusting the size of the aperture at the various points of risk it is possible to ensure that equal volumes of air are drawn through each branch pipe to the smoke-detector.

This refinement by which the volumes of air drawn from each point are equalized is required in large installations, since if the air were to be drawn through the outlets 16 and 19 there might be inadequate suction, particularly in the more remote holds. However, in a smaller installation the air may be drawn through the outlets 16 and 19, the non-return valves in these outlets being then omitted as well as the branch pipes 21 and the heads 22.

Water may condense in the pipes, particularly in the branch pipes, and block them, and because of the low pressures involved neither the air withdrawn to the smoke-detector nor the combustion gas delivered on the outbreak of fire may be able to overcome the block. It is preferred, therefore, to make a drainage opening in any pipe at a point where condensate is likely to collect and to close each opening by an absorbent pad which will allow water to seep through but prevent undesired entry of air. Such a pad is shown at 41 in Figure 6 and is held between the end of a short tube 42 and a cap 43 which is screwed onto the end of the tube and which has a drainage hole 44 in it. This can may be made of felt and as the hole 44 through which air could be drawn under suction is obviously small, it will offer sufficient resistance to limit the amount of air drawn in as the suction is quite low. The pad acts as a wick to allow any condensed moisture to evaporate to atmosphere. It is not necessary that an absolutely air tight arrangement be provided. Figure 3 shows one tube 42 let into a branch pipe 21.

I claim:

1. A combined smoke-detecting and fire-extinguishing apparatus for use with spaces constituting points of risk, comprising a pipe system having at the downstream ends outlets into the lower parts of said spaces, a source of combustion gas and a smoke-detector both connected to said pipe system and non-return valves in the pipes of said system permitting flow of said combustion gas through said outlets, said pipes having inlets for air flowing through the pipe system to said smoke-detector, said inlets being upstream of said non-return valves and in the upper parts of said spaces.

2. An apparatus as claimed in claim 1 in which the inlets are in air-collecting heads on the ends of branch pipes leading to the pipes containing the non-return valves.

3. An apparatus as claimed in claim 2 in which the collecting heads comprise caps screwed over the ends of the branch pipes, each cap having a lateral opening through which air is drawn into the space between the end of the pipe and the cap.

4. An apparatus as claimed in claim 3 in which each cap has a distance piece between the end of the pipe and the cap.

5. An apparatus as claimed in claim 1 in which a drainage opening for condensate is made in at least one of the pipes and is closed by an absorbent pad.

6. In a ship having holds or other substantially closed spaces constituting points of risk, a combined smoke-detecting and fire-extinguishing apparatus comprising a pipe system having at the downstream ends relatively large outlets into the lower parts of the said spaces, a source of combustion gas and a smoke-detector both connected to the pipe system, and non-return valves in the pipe system permitting flow of the gas through the outlets, the pipes also having relatively small inlets for air flowing through the pipe system to the smoke-detector, the inlets being upstream of the non-return valves and in the upper parts of the spaces.

7. An apparatus according to claim 1 in which the gas outlets are large in relation to the air inlets.

References Cited in the file of this patent

UNITED STATES PATENTS

| | | |
|---|---|---|
| 1,930,670 | Allen | Oct. 17, 1933 |
| 2,328,014 | Heigis | Aug. 31, 1943 |